US009253451B2

(12) United States Patent  
Kimura

(10) Patent No.: US 9,253,451 B2  
(45) Date of Patent: Feb. 2, 2016

(54) IMAGE RESTORATION METHOD, IMAGE RESTORATION APPARATUS, AND IMAGE-PICKUP APPARATUS

(71) Applicant: CANON KABUSHIKI KAISHA, Tokyo (JP)

(72) Inventor: Yoshinori Kimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 344 days.

(21) Appl. No.: 13/968,628

(22) Filed: Aug. 16, 2013

(65) Prior Publication Data

US 2014/0055595 A1 Feb. 27, 2014

(30) Foreign Application Priority Data

Aug. 24, 2012 (JP) ................. 2012-185318

(51) Int. Cl.
  *H04N 7/18* (2006.01)
  *G02B 21/36* (2006.01)
  *G06T 5/00* (2006.01)

(52) U.S. Cl.
  CPC ............... *H04N 7/18* (2013.01); *G02B 21/365* (2013.01); *G06T 5/002* (2013.01); *G06T 2207/10056* (2013.01); *G06T 2207/20081* (2013.01); *G06T 2207/30024* (2013.01)

(58) Field of Classification Search
  CPC .................................. H04N 7/18
  USPC ........................................ 348/80
  See application file for complete search history.

(56) References Cited

PUBLICATIONS

Lou et al., "Direct Sparse Deblurring", Journal of Mathematical Imaging and Vision, 2011, vol. 39, pp. 1-12.*
Lou, et al., "Direct Sparse Deblurring", Journal of Mathematical Imaging and Vision, 2011, vol. 39, pp. 1-12.
Elad, et al., "Image Denoising Via Sparse and Redundant Representations Over Learned Dictionaries", IEEE Transactions on Image Processing, 2006, vol. 15, pp. 3736-3745.

* cited by examiner

*Primary Examiner* — Sath V Perungavoor
*Assistant Examiner* — Jeffery Williams
(74) *Attorney, Agent, or Firm* — Rossi, Kimms & McDowell LLP

(57) ABSTRACT

A method includes performing an approximate partially coherent imaging operation for elements of a first basis generated from a model image having no noise and no blur, and generating based upon the first basis a second basis that is blurred, the approximate partially coherent imaging operation being expressed by a convolution integral on an eigenfunction corresponding to a maximum eigenvalue of a Kernel matrix and each element of the first basis, generating an intermediate image in which each pixel value of the observed image that has been denoised is replaced with its square root, and obtaining a restored image by approximating each of a plurality of patches that are set to entirely cover the intermediate image, using a linear combination of elements of the first basis and linear combination coefficients obtained when each patch is approximated by a linear combination of elements of the second basis.

7 Claims, 10 Drawing Sheets

10 μm

10 μm

10 μm

10 μm

10 μm

IMAGE RESTORATION METHOD, IMAGE RESTORATION APPARATUS, AND IMAGE-PICKUP APPARATUS

BACKGROUND OF THE INVENTION

1. Field of the Invention

The present invention relates to a restoration (reconstruction) of an image.

2. Description of the Related Art

An observed image obtained by a bright field microscope or a virtual slide including an image sensor (referred to as a "digital microscope" hereinafter) is known as an observed image obtained through a photoelectric conversion of an optical image formed by partially coherent imaging. Conventionally, no methods have been proposed for removing from the observed image a noise caused by the image sensor (which may be simply referred to as a "noise" hereinafter), or a blur caused by an optical system (which may be simply referred to as a "blur" hereinafter). It is a conventionally proposed method to restore an original image by removing the noise and blur from a deteriorated image obtained by photoelectrically converting an optical image formed by incoherent imaging.

For example, Yifei Lou, Andrea L. Bertozzi, and Stefano Soatto, "Direct Sparse Deblurring, "Journal of Mathematical Imaging and Vision," 2011, vol. 39, p. 1-12 ("literature 1") proposes a method for removing a noise and a blur from a deteriorated image using a set of image patches extracted from a model image and a set in which each patch is blurred by a convolution integral of a point-image intensity distribution of an optical system. Michael Elad and Michal Aharon, "Image Denoising Via Sparse and Redundant Representations Over Learned Dictionaries," IEEE Transactions of Image Processing, 2006, vol. 15, p. 3736-3745 ("literature 2") proposes a method for removing a noise caused by an image sensor from a deteriorated image using a set of image patches generated by machine learning from a model image.

However, the image restoration methods disclosed in the literatures 1 and 2 address incoherent imaging and cannot sufficiently deblur the observed image obtained from the optical image formed by partially coherent imaging.

SUMMARY OF THE INVENTION

The present invention provides an image restoration method, an image restoration apparatus, and an image-pickup apparatus, which can eliminate a blur caused by an optical system from an observed image obtained by a photoelectric conversion of an optical image formed by partially coherent imaging.

An image restoration method according to the present invention is configured to restore an original image from an observed image obtained through a photoelectric conversion of an optical image formed by partially coherent imaging. The image restoration method includes the steps of performing an approximate partially coherent imaging operation for elements of a first basis generated from a model image that is assumed to have no noise and no blur, and generating based upon the first basis a second basis that is blurred, the approximate partially coherent imaging operation being expressed by a convolution integral on an eigenfunction corresponding to a maximum eigenvalue of a Kernel matrix and each element in the first basis, generating an intermediate image in which each pixel value of the observed image that has been denoised is replaced with its square root, and obtaining a restored image by approximating each of a plurality of patches that are set to entirely cover the intermediate image, using a linear combination between the first basis and a linear combination coefficient obtained when each patch is approximated by a linear combination of the second basis.

Further features of the present invention will become apparent from the following description of exemplary embodiments with reference to the attached drawings.

DESCRIPTION OF THE EMBODIMENTS

Figure 1:
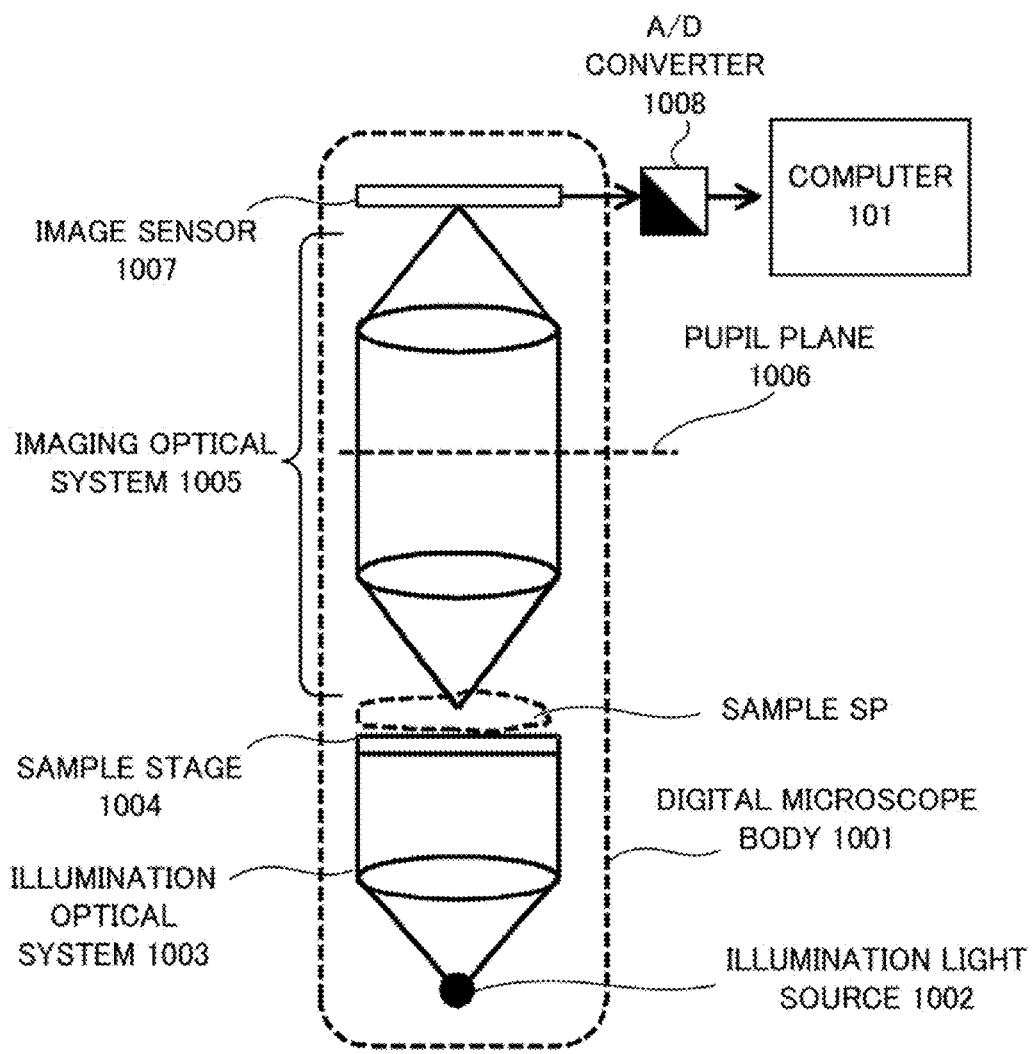
FIG. 1 is a block diagram of an illustrative configuration of a digital microscope according to this embodiment.

FIG. 1 is a block diagram of an illustrative configuration of a digital microscope (image-pickup apparatus) according to this embodiment. The digital microscope includes a digital microscope body 1001, an A/D converter 1008, and a computer 101.

The digital microscope body 1001 includes an illumination light source 1002, an illumination optical system 1003, a sample (specimen) stage 1004, an imaging optical system 1005, and an image sensor 1007.

The illumination light source 1002 emits light, and serves as a set of point light sources. The illumination optical system 1003 illuminates a sample (specimen) SP, such as a präparat, using the light from the illumination light source 1002 (partially coherent illumination). The sample SP is an object as an original image to be restored. The sample stage 1004 is mounted with and moves the sample SP in three directions. The imaging optical system 1005 forms an image of the sample SP on the image plane of the image sensor 1007.

This embodiment thus forms the optical image of the object through partially coherent imaging, and the optical image contains a blur caused by an optical system of the partially coherent imaging (which may be referred to as a "partially coherent imaging optical system" hereinafter). The partially coherent imaging optical system includes both the illumination optical system 1003 and the imaging optical system 1005.

The image sensor 1007 is an image-pickup element (photoelectric conversion element) configured to photoelectrically convert the optical image of the object formed by the imaging optical system 1005 into an analogue electric signal. The image sensor 1007 can use a charged coupled device ("CCD"), a complementary metal oxide semiconductor ("CMOS"), etc. The optical image contains a noise caused by the image sensor 1007.

The A/D converter 1008 converts the analogue electric signal from the image sensor 1007 into a digital signal.

The computer 101 provides various types of image processing for the digital signal output from the A/D converter 1008, in addition to storing, displaying, and communicating information. In particular, according to this embodiment, the computer 101 executes an image restoration method.

In the image restoration method, the computer 101 restores an original image by performing image processing of removing the noises caused by the image sensor and the blurs caused by the partially coherent imaging optical system, from the digital signal representing the observed image of the object. In other words, the computer 101 serves as an image restoration apparatus configured to restore the original image by performing image processing for the input digital electric signal. The image restoration apparatus may not be configured as part of the image-pickup apparatus, but may be configured as an independent apparatus, such as a PC.

The illumination light emitted from the illumination optical system 1002 passes the illumination optical system 1003, illuminates the sample SP on the sample stage 1004, then passes the imaging optical system 1005, and forms an image on an imaging plane of the image sensor 1007. An epi-illumination may be used for the illumination method, which illuminates the sample SP from the top, and forms an image using the reflected light. The analogue electric signal output from the image sensor 1007 is converted into the digital electric signal by the A/D converter 1008, and input into the computer 101.

Figure 2:
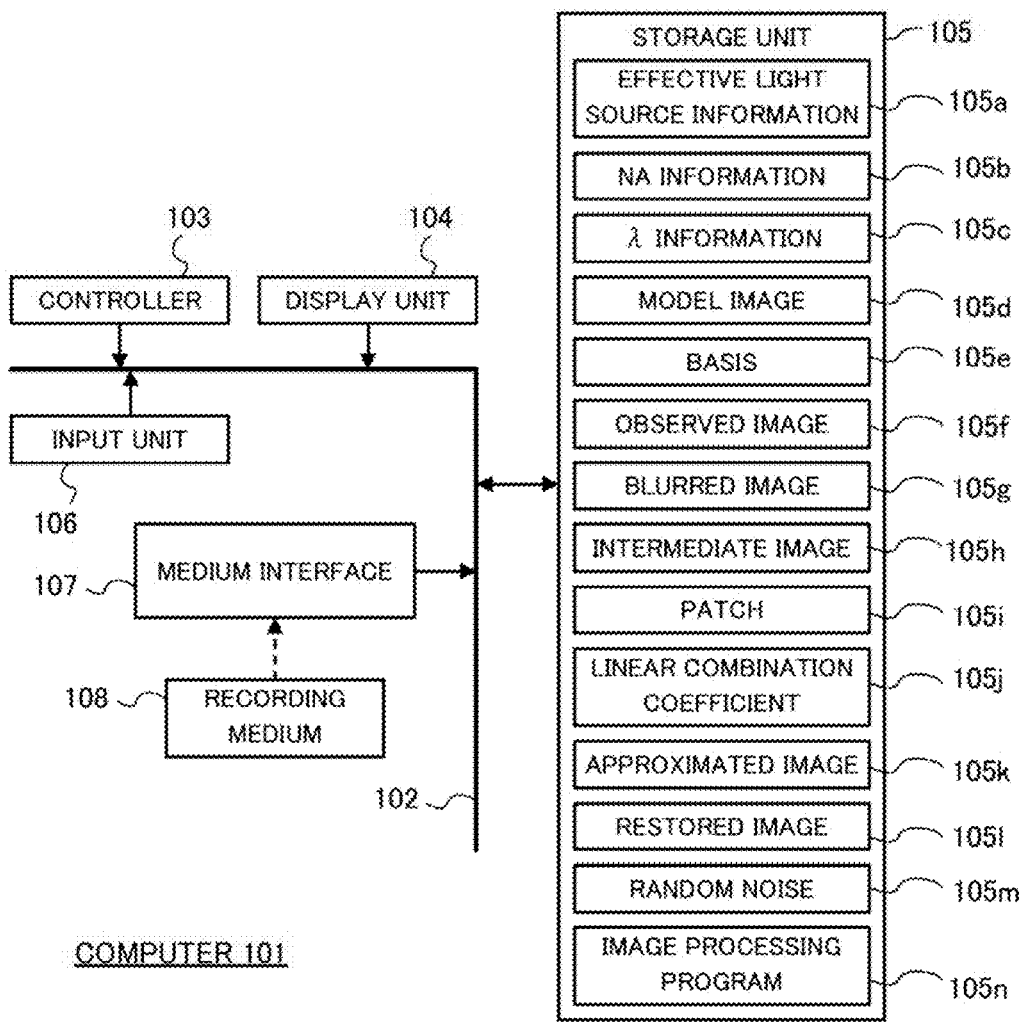
FIG. 2 is a block diagram of an illustrative configuration of a computer illustrated in FIG. 1.

FIG. 2 is a block diagram of an illustrative configuration of the computer 101. The computer 101 includes bus wiring 102, a controller 103, a display unit 104, a storage unit 105, an input unit 106, and a medium interface 107.

The bus wiring 102 connects the controller 103, the display unit 104, the storage unit 105, the input unit 106, and the medium interface 107 with one another. The controller 103 is, for example, a CPU, a GPU, a DSP (processor), or a microcomputer, and includes a cashe memory (not illustrated) for temporary storage.

The display unit 104 is a display device, such as a CRT display and a liquid crystal display. The storage unit 105 is, for example, a memory and a hard disk drive, configured to store various types of information.

The input unit 106 is, for example, a keyboard and a pointing device (such as a mouse). The medium interface 107 is, for example, a CD-ROM drive and a USB interface, configured to connect the recording medium 108 to the bus wiring 102. The recording medium 108 includes a CD-ROM and a USB memory.

The information stored in the storage unit 105 contains effective light source information 105*a*, NA information 105*b*, λ information 105*c*, model image 105*d*, a basis 105*e*, an observed image 105*f*, a blurred image 105*g*, an intermediate image 105*h*, a patch 105*i*, a linear combination coefficient 105*j*, an approximated image 105*k*, a restored image 105*l*, a random noise 105*m*, and an image processing program 105*n*.

The effective light source information 105*a* is information relating to a light intensity distribution formed on a pupil plane 1006 in the imaging optical system 1005 when there is no sample.

The NA information 105*b* is information relating to a numerical aperture ("NA") on the image side of the imaging optical system 1005.

The λ information 105*c* is information relating to a wavelength (λ) of the illumination light source 1002.

The model image 105*d* is a base image used to generate the basis 105*e*, and a sharp image that is assumed to have no noises and no blurs. The model image 105*d* is, for example, an image obtained by a scanning electron microscope ("SEM").

The storage unit 105 can store, in part of the model image 105*d*, a blurred model image, which is generated by a partially coherent imaging operation from the model image 105*d*.

The basis 105*e* is a set of image patches of N pixels×N pixels generated from random sampling or machine learning (dictionary learning) from the image, such as the model image 105*d*. The random sampling is user processing of extracting a predetermined number of image patches of N pixels×N pixels from the image at random locations. The machine learning is processing of generating a user designated number of image patches of N pixels×N pixels using a machine learning algorithm K-SVD method from an image, etc. For example, the basis 105*e* may use a set of 256 elements of 8 pixels×8 pixels.

A basis {b} (first basis) generated from the model image 105*d* is a basis having no noises and no blurs similar to the model image 105*d*, and reflects the characteristic of the model image. A basis {b'} (second basis) is generated by performing the following approximate partially coherent imaging operation for the basis {b} and is a blurred basis having no noises. Elements $b_1, b_2, \ldots, b_n$, of the basis {b} correspond to elements $b'_1, b'_2, \ldots, b'_n$, of the basis {b'}. A basis {b"} (third basis) may be generated from the blurred model image.

The observed image 105*f* is an image obtained from the digital microscope body 1001 via the A/D converter 1008.

The blurred image 105*g* is an image that is made by removing the noise caused by the image sensor 1007 from the observed image 105*f*.

The intermediate image 105*h* is an image made by converting pixel values in the observed image 105*f* or the blurred image 105*g* into values suitable for image processing. For example, one illustrative conversion is replacing each pixel value of the blurred image 105*g* with its square root.

The patches 105*i* are a plurality of small segments that are set so as to cover the intermediate image 105*h*, and each patch is an image piece having a size of N pixels×N pixels.

The linear combination coefficient 105*j* is a coefficient obtained when the patches 105*i* are approximated with a linear combination of elements of the basis 105*e*. The linear combination coefficient 105*j* is a vector having the same dimension as that of elements of the basis 105*e*.

The approximated image 105*k* is an image generated from the approximated patches that is expressed by approximating the patches 105*i* using the basis. The size of the approximated image 105*k* is the same as the size of the observed image, and the initial values of any pixels in the approximated image 105*k* are zero. The blurred image 105*g* is a set of all patches of the approximate image 105*k* made by approximating the patches 105*i* with the linear combination of the second basis that is blurred but has no noises. In addition, the restored image 105*l* is a set of all patches of the approximated image 105*k* made by approximating the patches 105*i* with the linear combination of elements of the first basis that has no noises and no blurs.

The restored image 105*l* is an image generated from the approximated image 105*k*.

The random noise 105*m* is an artificially generated noise in accordance with a condition designated by a user. The artificially generated noises do not perfectly accord with the noises caused by the image sensor, and thus a plurality of types of linear combination coefficients 105*j* are averaged obtained when a plurality of types of noises are generated by the random noise 105*m*. When the random noise 105*m* generates a plurality of types of noises, the storage unit 105 stores an end condition that defines the number of types (or the number of generations or the number of iterations).

The image processing program 105*n* is a program that enables the controller 103 to execute image processing of removing the noise caused by the image sensor 1007 and the blur caused by the partially coherent imaging optical system, from the observed image 105*f* or the blurred image 105*g*.

Figure 3:
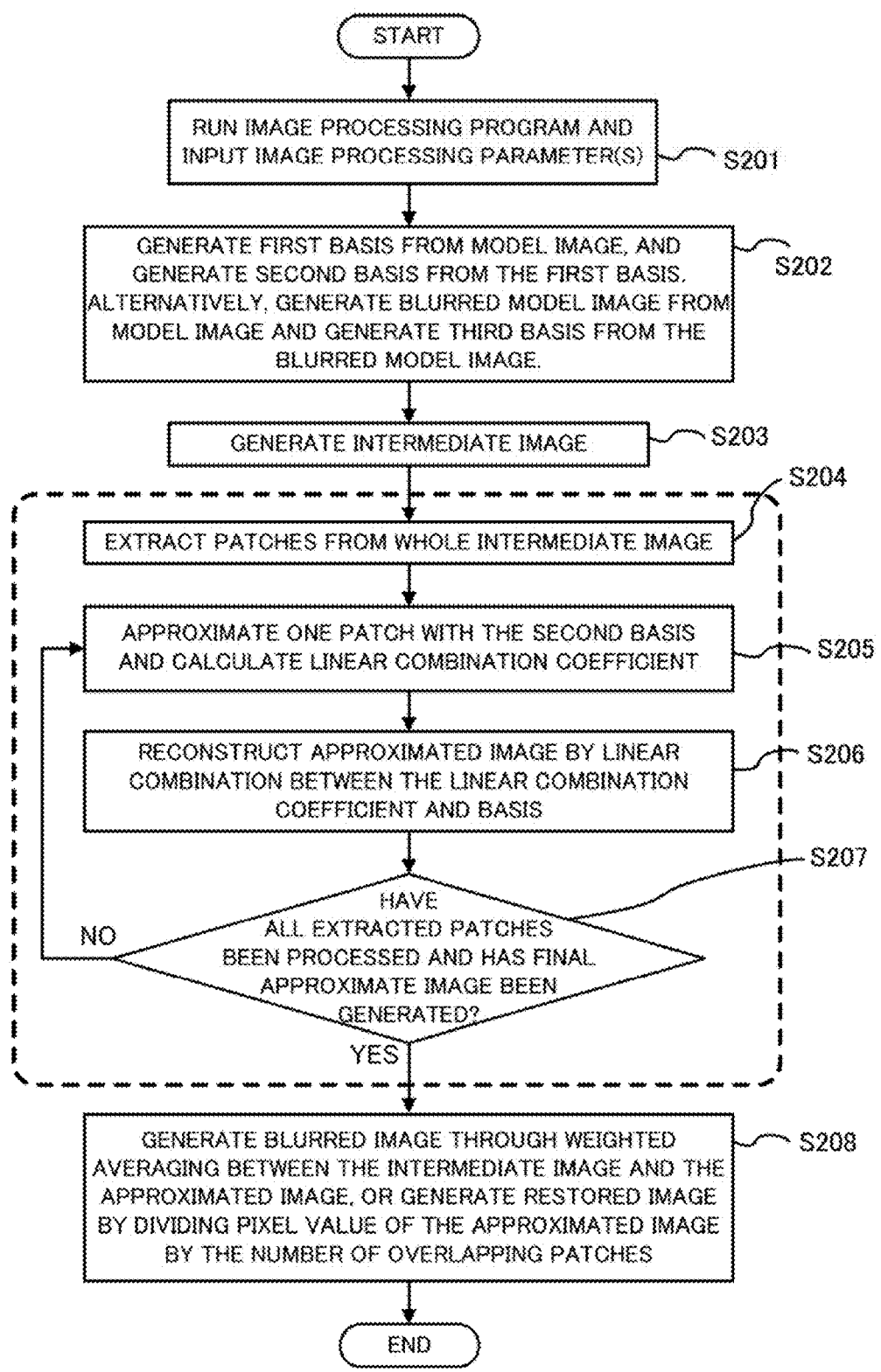
FIG. 3 is a view for explaining S206 illustrated in FIG. 2.

FIG. 3 is a flowchart for explaining image processing performed for the observed image 105*f* or the blurred image 105*g*. "S" stands for the step, and this rule is true of another flowchart. The flowchart illustrated in FIG. 3 can be implemented as an image processing program 105*n* for executing the controller 103 in the computer 101 to execute each step, and this is true of another flowchart. The flowchart illustrated in FIG. 3 is a fundamental flowchart of embodiments, which will be described later.

Initially, the recording medium 108 in which the image processing program 105*n* is recorded is connected to the medium interface 107, and the image processing program 105*n* is installed in the storage unit 105 via the controller 103. A start-up command of the image processing program 105*n* is input into the input unit 106 by the user, and the controller 103, in response, refers to the memory unit 105 and runs the image processing program 105*n* (S201).

In addition, the image processing parameter input by the user to the input unit 106 is stored in the storage unit 105 by the controller 103 (S201). The "image processing parameter" contains the effective light source information 105*a*, the NA information 105*b*, the λ information 105*c*, the model image 105*d*, the basis 105*e*, and the observed image 105*f*.

Next, the controller 103 refers to the storage unit 105, generates the first basis from the model image 105*d* through the random sampling or machine learning (S202), and stores the first basis in the storage unit 105. Depending upon the object of the image processing, the second basis may be generated by performing the partially coherent imaging operation for each element of the first basis or the blurred model image may be generated by performing the partially coherent imaging operation for the model image 105*d* and the third basis may be generated from the blurred model image.

Next, the controller 103 refers to the storage unit 105, and generates the intermediate image 105*h* from the observed image 105*f* or the blurred image 105*g* (S203), and stores the intermediate image 105*h* in the storage unit 105. For example, in the processing of removing the blur caused by the partially coherent imaging optical system from the blurred image 105*g*, the intermediate image 105*h* is generated by replacing each pixel value of the blurred image 105*g* with its square root.

S204 to S207 are processing of generating the approximated image 105*k* from the intermediate image 105*h* by the controller 103, and will be referred to as "core processing" hereinafter.

Initially, the controller 103 refers to the storage unit 105, extracts the patches 105*i* from the intermediate image 105*h* (S204), and stores them in the storage unit 105. The extracted patches may or may not have an overlapping part but the patches 105*i* need to comprehend the whole intermediate image or closely covers the intermediate image. In addition, the extracting rule of the patches 105*i* needs to be uniformly applied to the entire intermediate image, and cannot be changed in the middle of the extraction. For example, unless the patch projects from the intermediate image 105*h*, the patch 105*i* may be extracted so that it overlaps the adjacent patch 105*i* by one pixel at its end.

Next, the controller 103 refers to the storage unit 105, approximates one patch 105*i* with the linear combination of elements of the second basis, calculates the linear combination coefficient 105*j* (S205), and stores the linear combination coefficient 105*j* in the storage unit 105. The linear combination coefficient 105*j* is determined so as to satisfy the following expressions:

$$A = \operatorname*{argmin}_{\tilde{A}} \|\tilde{A}\|_0 \text{ subject to } \|x - x'\|_2^2 < \varepsilon \qquad \text{Expression 1}$$

$$x' = \sum_i \tilde{A}_i B_i$$

Herein, A and $\tilde{A}$ denote linear combination coefficients 105*j* of the basis 105*e*, $\|\tilde{A}\|_0$ denotes the number of non-zero elements in the linear combination coefficient $\tilde{A}$, x denotes a brightness value distribution of one of patches 105*i*, and x' denotes a brightness value distribution of the patch x that is approximated with a linear combination of elements of the basis 105*e* and the linear combination coefficient $\tilde{A}$. $\|x-x\|_2^2$ denotes a square sum of a difference between a brightness distribution of the patch x and the linear combination approximation using the basis 105*e*, and ε denotes the approximation precision of the linear combination designated by the user. In other words, under the approximation precision designated by the user, the linear combination coefficients 105*j* having minimum non-zero elements are calculated.

Next, the controller 103 refers to the storage unit 105, and reconstructs the approximated image 105*k* by approximating one patch 105*i* extracted from the intermediate image 105*h* using the linear combination of the linear combination coefficient 105*j* and elements of the basis (S206). Thereafter, the controller 103 returns the approximated patch 105*i* to the original position and stores the result. When the basis used in S206 is the second basis, the blurred image is finally generated, and when the second basis is replaced with the first basis, the restored image is finally generated.

Figure 4:
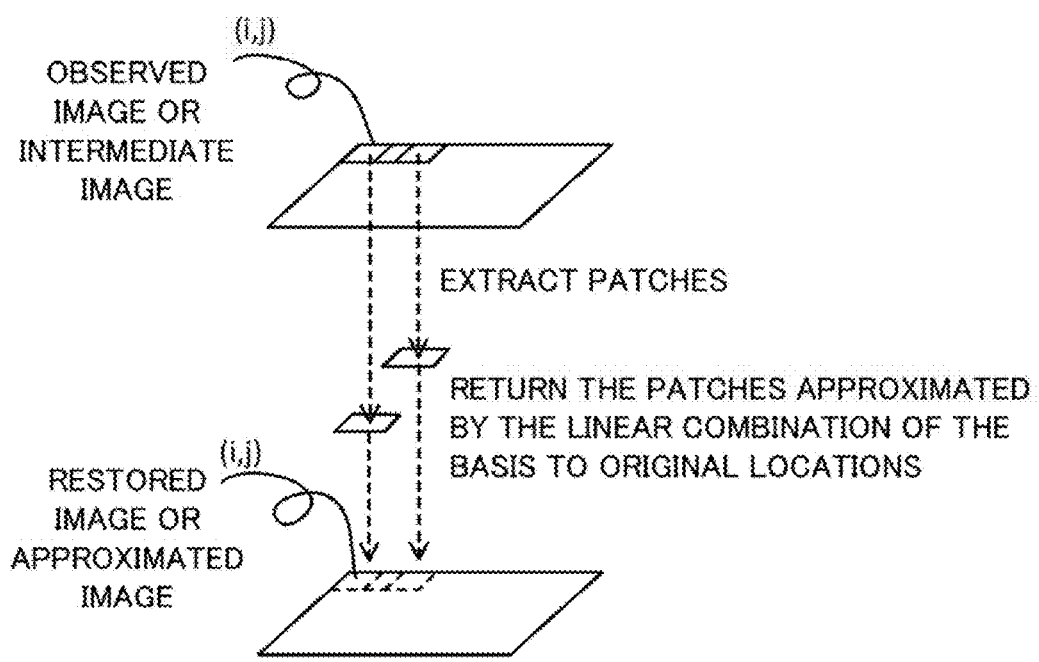
FIG. 4 is a flowchart for explaining image processing according to first and second embodiments.

FIG. 4 is a view for explaining processing of returning the patches 105*i* to the extracted original locations. The patch 105*i* extracted from a certain location (i, j) of the intermediate image 105*h* is approximated by the linear combination of the linear combination coefficient 105*j* and elements of the basis, and the pixel value of the approximated patch 105*i* is added to the location (i, j) in the approximated image. Even when overlapping location occurs between adjacent patches, the pixel value of the location is expressed by additions. The reconstruction of the approximated image 105*k* means processing of generating an image in the course of generating the finally approximated image 105*k*.

Next, the controller 103 refers to the storage unit 105, performs S205 and S206 for all patches 105*i*, and generates the finally approximated image 105*k* (S207).

The above processing is the core processing.

Next, the controller 103 refers to the storage unit 105, and executes weighted averaging between the observed image 105*f* and the approximated image 105*k* for each pixel, and generates the blurred image 105*g* in which the noise caused by the image sensor 1007 has been removed or the restored image 105*l* (S208). When the intermediate image of S203 is the observed image, the blurred image is generated. When the intermediate image is the blurred image, the restored image is generated. The blurred image 105g or the restored image 105l is stored in the storage unit 105. The weighted averaging has both an effect of removing overlapping between the patches (an effect of a division) and an effect of removing the noise. Since the restored image has no noises, only a division may be performed instead of weighted averaging. The controller 103 may display the restored image 105l on the display unit 104.

As described above, the image processing of this embodiment can remove the noise caused by the image sensor 1007 from the observed image 105f obtained by the digital microscope body 1001 or remove the blur caused by the partially coherent imaging optical system from the blurred image 105g.

A detailed description will be given of the image processing method in the following embodiments.

First Embodiment

This embodiment performs for the observed image 105f image processing of removing the noise caused by the image sensor and blur caused by the partially coherent imaging optical system, and obtains the restored image having no noises and no blurs.

Figure 5:
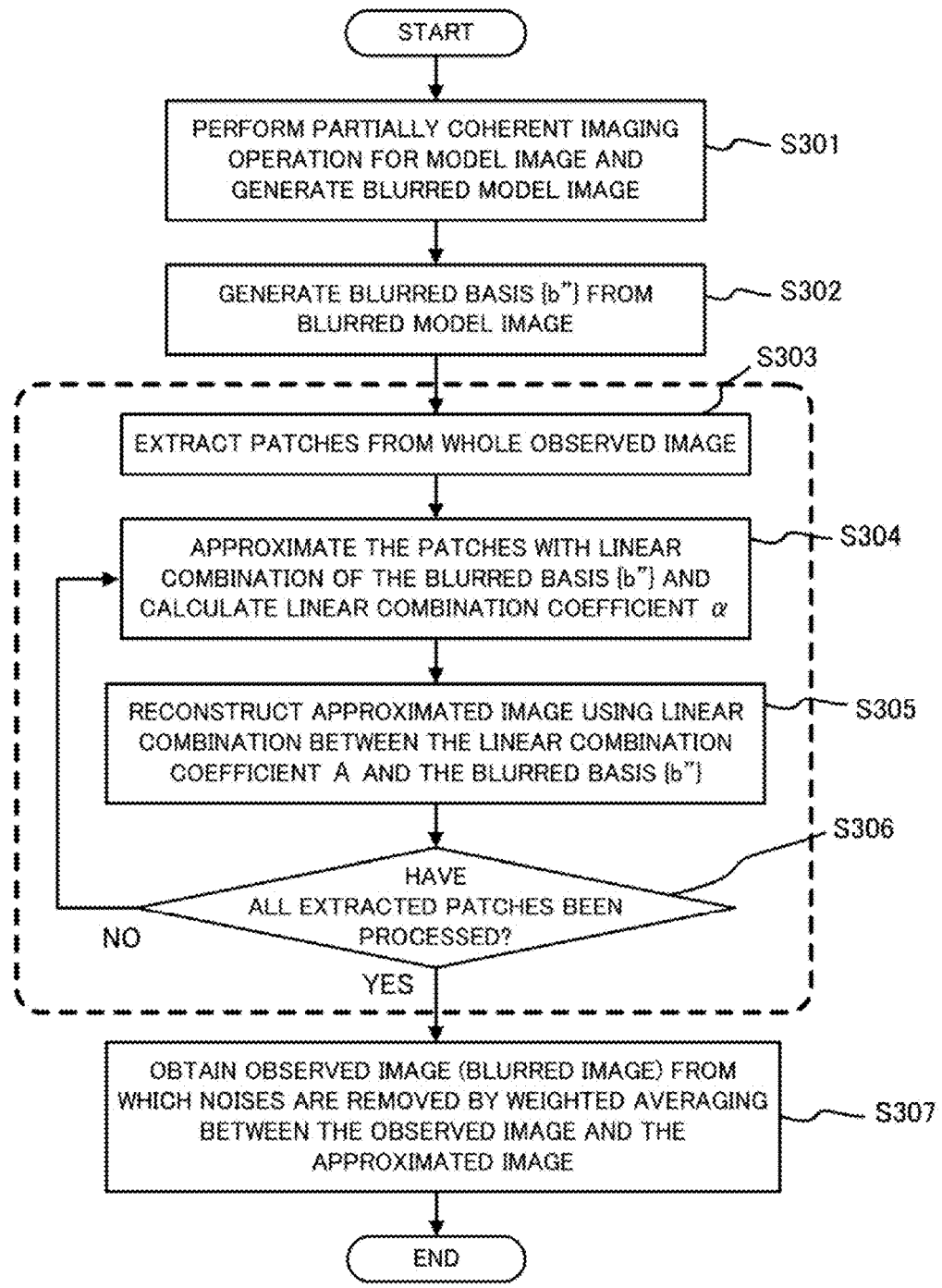
FIG. 5 is a flowchart for explaining an image processing method configured to generate a blurred image in which a noise caused by an image sensor is removed from an observed image according to the first embodiment.

FIG. 5 is a flowchart for explaining a method for generating a blurred image 105g made by removing the noise caused by the image sensor from the observed image 105f.

Initially, the controller 103 refers to the storage unit 105, performs a partially coherent imaging operation for the model image 105d, generates a blurred model image (S301), and stores the blurred model image in the storage unit 105. Alternatively, a user may store, as the blurred model image in the storage unit 105, an image captured under the same optical condition as the target digital microscope.

Next, the controller 103 refers to the storage unit 105, generates a blurred basis {b"} (third basis) from the blurred model image (S302), similar to the processing of S202, and stores the blurred basis {b"} in the storage unit 105. In addition, each element of the blurred basis {b"} is normalized by a division using an L2 norm. The L2 norm is a scalar amount expressed as follows:

$$\|b_i''\|_2 = \sqrt{\sum_{j=1}^{N \times N} |b_{ij}''|^2} \quad \text{Expression 2}$$

Herein, $b_i''$ denotes an i-th element of the blurred basis {b"}, $\|b_i''\|_2$ denotes the L2 norm of $b_i''$, and $b_{ij}''$ denotes a j-th pixel value.

Next, the controller 103 refers to the storage unit 105, extracts the patches 105i from the observed image 105f similar to the processing of S204, and stores the patches 105i in the storage unit 105 (S303).

Next, the controller 103 refers to the storage unit 105, approximates one of the patches with the blurred basis {b"}, calculates a linear combination coefficient α similar to S205 (S304), and stores the linear combination coefficient α in the storage unit 105.

Next, the controller 103 refers to the storage unit 105, reconstructs the approximated image 105k using the linear combination coefficient α and the blurred basis {b"} (S305), similar to the processing of S206, and stores the approximated image 105k in the storage unit 105.

Next, the controller 103 refers to the storage unit 105, performs S304 and S305 for all patches 105i, generates the finally approximated image 105k (S306), and stores the pixel values of the finally approximated image 105k in the storage unit 105.

Next, the controller 103 refers to the storage unit 105, executes the weighted averaging between the observed image 105f and the approximate image 105k for each pixel, generates the blurred image 105g by removing the noise caused by the image sensor from the observed image 105f (S307), and stores the blurred image 105g in the storage unit 105.

$$X = \frac{pY + X'}{p + cnt} \quad \text{Expression 3}$$

Herein, X denotes a pixel value of one pixel in the blurred image 105g. Y denotes a pixel value of one corresponding pixel in the observed image 105f. X' denotes a pixel value of one corresponding pixel in the approximated image 105k, p is a weighting parameter designated by the user based upon the magnitude of the noise caused by the image sensor, "cnt" denotes an overlapping number of the patch 105i in one corresponding pixel of the approximated image 105k.

The processing can be expedited by distributing the processing of S304 among a plurality of operating units. The method for generating the blurred image 105g by removing the noise caused by the image sensor from the observed image 105f has been thus described.

Figure 6:
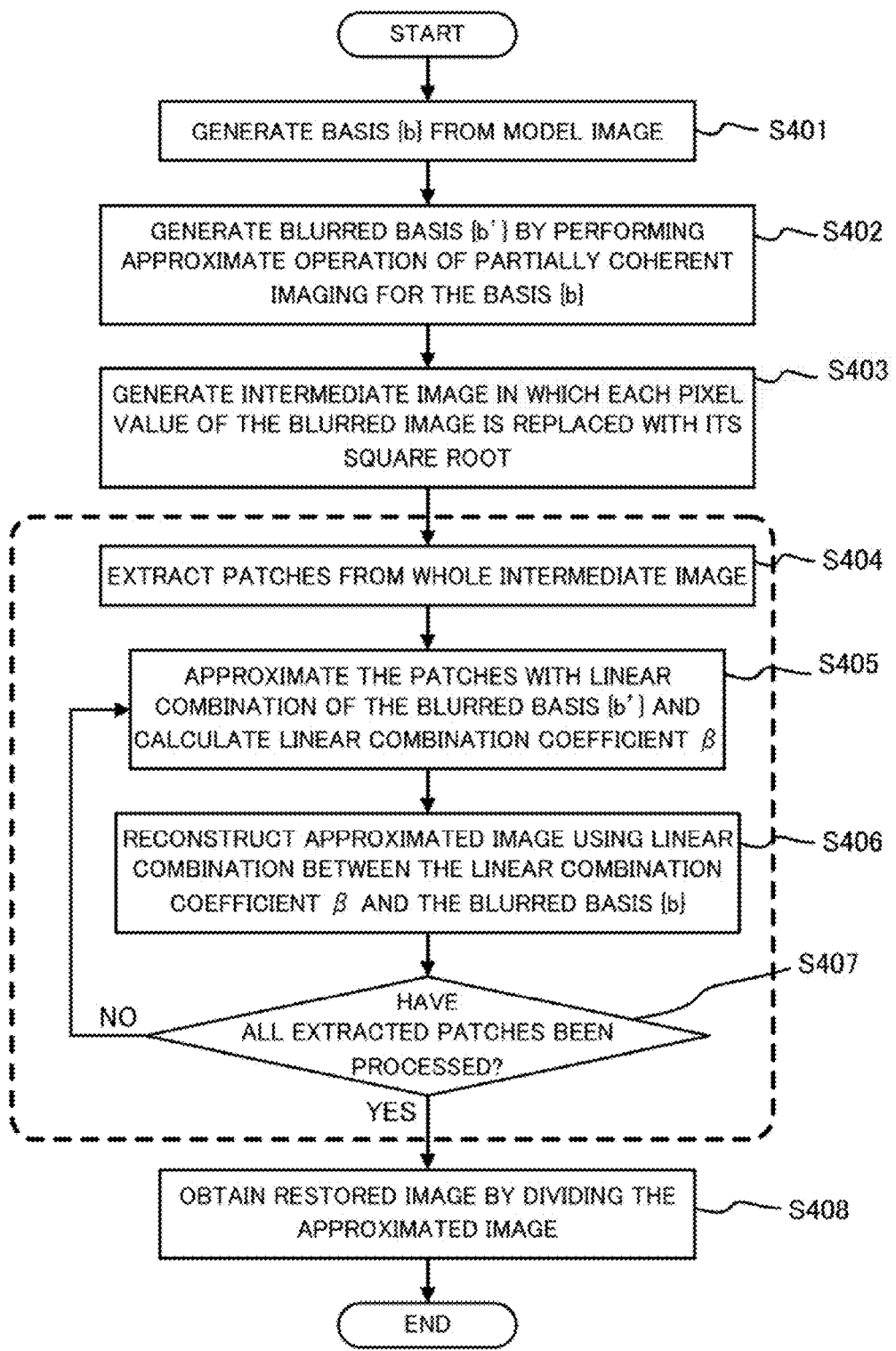
FIG. 6 is a flowchart for explaining processing of removing blurs from a blurred image according to the first embodiment.

FIG. 6 is a flowchart for explaining a method for generating a restored image 105l by removing the blur caused by the partially coherent imaging optical system from the blurred image 105g obtained by S307.

Initially, the controller 103 refers to the storage unit 105, generates the basis {b} similar to the processing of S202 from the model image 105d (S401), and stores the basis {b} in the storage unit 105. Each element of the basis {b} is normalized through a division using its L2 norm.

Next, the controller 103 refers to the storage unit 105, performs an approximate partially coherent imaging operation for each element of the basis {b}, generates a blurred basis {b'} (S402), and stores it in the storage unit 105. In this approximate partially coherent imaging operation, the controller 103 executes an imaging operation expressed by a convolution integral on each element of and the basis {b} and an eigenfunction corresponding to the maximum eigenvalue of the Kernel matrix expressed by the following expression which has a Fourier transform of a shifted pupil function as an element.

$$K = \begin{pmatrix} \sqrt{S_1}\,\psi_1(x_1, y_1) & \cdots & \sqrt{S_m}\,\psi_m(x_1, y_1) \\ \vdots & \ddots & \vdots \\ \sqrt{S_1}\,\psi_1(x_n, y_n) & \cdots & \sqrt{S_m}\,\psi_m(x_n, y_n) \end{pmatrix} \quad \text{Expression 4}$$

Herein, K denotes the Kernel matrix, Si denotes an intensity at an i-th point of the effective light source, and $(x_i, y_i)$ is an i-th coordinate on the image plane. $\psi_i$ is given as follows:

$$\psi_i = FT[P(f-f_i, g-g_i)] \quad \text{Expression 5}$$

Herein, FT denotes a Fourier transform, P denotes a pupil function, $(f_i, g_i)$ denotes a coordinate on the pupil plane of the i-th point in the effective light source, and (f, g) denotes a coordinate of the pupil plane.

In addition, an eigenvalue of the Kernel matrix and the corresponding eigenfunction are given as follows:

$$K = USV^\dagger$$

$$U = [\Phi_1, \Phi_2 \ldots]$$

$$S = \text{diag}[\lambda_1, \lambda_2 \ldots] \quad \text{Expression 6}$$

Herein, $USV^\dagger$ denotes a matrix obtained by performing a singular value decomposition for the Kernel matrix, $\lambda_i$ denotes an i-th eigenvalue and positive real number, $\Phi_i$ denotes an eigenfunction as a vector amount corresponding to the i-th eigenvalue, and "diag" denotes a diagonal matrix having $\lambda_i$ as a diagonal component. At this time, elements of the basis {b'} are calculated based upon the elements of the basis {b} as follows:

$$b'_j = \sum_i \lambda_i^2 |\Phi_i \otimes b_j|^2 \quad \text{Expression 7}$$

Herein, $b_j$ denotes the j-th element of the basis {b}, and $b_j'$ denotes the corresponding j-th element of the basis {b'}. Other symbols are similar to those in Expression 6.

In the partially coherent imaging operation, it is known that Expression 7 can be precisely approximated as follows only using the eigenfunction corresponding to the maximum eigenvalue. The symbols that are used are similar to those of Expression 7.

$$b'_j = \sum_i \lambda_i^2 |\Phi_i \otimes b_j|^2 \quad \text{Expression 8}$$

$$\approx \lambda_1^2 |\Phi_1 \otimes b_j|^2$$

Next, both sides of Expression 8 are square-rooted and the basis {b'} is newly defined as follows:

$$b'_j = (b'_j)^{\frac{1}{2}} = \lambda_1(\Phi_1 \otimes b_j) \quad \text{Expression 9}$$

Herein, the employed symbols are similar to those of Expression 7. Thereby, the elements of the basis {b} and the corresponding elements of the basis {b'} are approximated with a linear relationship. The imaging operation that is the partially coherent imaging operation expressed as in Expression 9, by a convolution integral of the eigenfunction corresponding to the maximum eigenvalue of the Kernel matrix is herein referred to as an approximate partially coherent imaging operation. Conventionally, it has not yet been proposed to generate the basis {b'} from the basis {b} using the approximate partially coherent imaging operation.

Next, the controller 103 refers to the storage unit 105, generates the intermediate image 105h by replacing each pixel value of the blurred image 105g with its square root (S403), and stores it in the storage unit 105.

$$I_{ij} = (J_{ij})^{\frac{1}{2}} \quad \text{Expression 10}$$

Herein, $I_{ij}$ denotes an ij-th pixel value of the intermediate image 105h, and $J_{ij}$ denotes an ij-th pixel value of the blurred image 105g. According to the approximate partially coherent imaging operation, as described for Expression 9, this operation is performed because a square root of the blurred image 105g has an approximately linear relationship with a non-blurred image. S403 has not yet been conventionally proposed.

Next, the controller 103 refers to the storage unit 105, extracts the patches 105i from the entire intermediate image similar to the processing of S204 (S404), and stores the patches 105i in the storage unit 105.

Next, the controller 103 refers to the storage unit 105, approximates one of the patches 105i with the linear combination of elements of the basis {b'} similar to the processing of S205, calculates the linear combination coefficient β (S405), and stores the combination coefficient β in the storage unit 105.

Next, the controller 103 refers to the storage unit 105, calculates the patches 105i by removing the blur using the linear combination of the linear combination coefficient β and elements of the basis {b}, and reconstructs the approximated image 105k by returning the patches 105i to the original locations similar to the processing of S206 (S406). The controller stores the approximated image 105k in the storage unit 105.

S406 replaces the basis {b'} (which is a set of elements $b'_1$, $b'_2$, ..., $b'_n$) with the basis {b} (which is a set of elements $b_1$, $b_2$, ..., $b_n$). In other words, when the linear combination coefficient β is expressed by β=$a_1, a_2, \ldots, a_n$, the patches are expressed as $a_1 \cdot b'_1 + a_2 \cdot b'_2 + \ldots, a_n \cdot b'_n$ in S405 and as $a_1 \cdot b_1 + a_2 \cdot b_2 + \ldots, a_n \cdot b_n$ in S406.

Next, the controller 103 performs processing of S405 and S406 for all patches 105i (S407), and stores the finally obtained pixel values of the approximated image 105k in the storage unit 105.

Next, the controller 103 refers to the storage unit 105, and generates the pixel values of the finally restored image 105l by dividing the pixel value at the overlapping location of the patches 105i in the approximated image 105k by the number of overlapping patches (S408). The controller 103 displays the generated restored image on the display unit 104 or stores it in the storage unit 105.

The processing can be expedited when the processing of S405 is distributed among a plurality of operating units. The method of generating the restored image 105l by removing the blur caused by the partially coherent imaging optical system from the blurred image 105g is thus described.

Thus, this embodiment obtains the restored image 105l by approximating each patch using the linear combination of elements of the basis {b} and the linear combination coefficient β obtained when each of the plurality of patches set to cover the entire intermediate image is approximated with the linear combination of the second basis.

FIGS. 7A-7E are views for explaining the effect of the image restoration method according to the first embodiment. These figures illustrate the result when the blurred image 105g is generated by removing the noise from the observed image 105f by a partially coherent imaging simulator, and then the restored image 105l is generated by removing the blur from the blurred image 105g. In addition, in order to compare this embodiment with the prior art, the result of generating the restored image 105l that is made by denoising and deblurring the observed image 105f by the method disclosed in the literature 1 is also illustrated.

As a simulation condition, assume that a sampling pitch on the object is 0.2 μm, the object side NA of the imaging optical system 1005 is 0.7, the illumination optical system 1003 provides an annular illumination in which an outer σ is 0.7 and an inner σ is 0.3, and a wavelength of the illumination light source 1002 is 0.55 μm. The basis includes 256 elements each of which has 8 pixels×8 pixels, and is generated by a machine learning algorithm. The image size is uniformly 100 pixels×100 pixels. In the linear combination coefficient α, there are about 10 to 15 non-zero elements. This is true of the linear combination coefficient β.

Figure 7A:
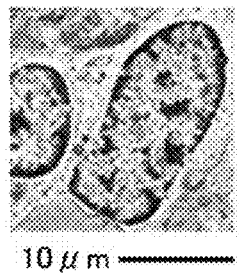
FIGS. 7A-7E are views for explaining effects of the image processing method according to the first embodiment.

FIG. 7A illustrates an original image corresponding to an object.

Figure 7B:
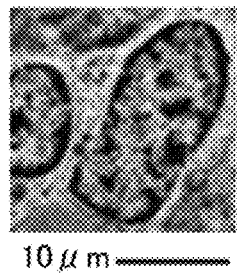

FIG. 7B illustrates a virtual object image in which a deterioration corresponding to a blur caused by the partially coherent imaging optical system is added to the original image by the partially coherent imaging simulator, and a white Gaussian noise of a standard deviation of 5% corresponding to the noise caused by the image sensor is further added.

Figure 7C:
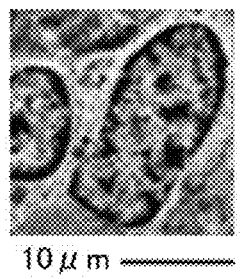

FIG. 7C illustrates a blurred image that is made by denoising the observed image in accordance with the flow of FIG. 5.

Figure 7D:
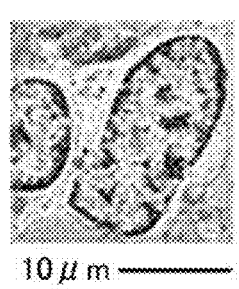

FIG. 7D illustrates a restored image that is made by deblurring the blurred image in accordance with the flow of FIG. 6.

Figure 7E:

FIG. 7E illustrates a restored image that is made by denoising and deblurring the observed image by the method disclosed in the literature 1.

Table 1 summarizes a quantitative evaluation result of the image quality. In order to compare the first embodiment with the prior art, the image restoration result made by the method disclosed in the literature 1 is included. The evaluation index uses the PSNR. This is calculated from a difference of a pixel value between the original image and the comparative image, and indicates that the larger the value is the closer to the original image the comparative image is.

TABLE 1

|  | Observed Image | Denoised image (blurred image) | Restored image | Restored image made by the method of literature 1 |
| --- | --- | --- | --- | --- |
| PSNR [dB] | 12.17 | 13.07 | 19.85 | 13.71 |

It is understood from FIG. 7 and Table 1 that this embodiment can generate a higher-quality restored image.

Second Embodiment

This embodiment also performs for the observed image 105*f* image processing of removing a noise caused by the image sensor and a blur caused by the partially coherent imaging optical system, and obtains the restored image having no noise and no blur.

Figure 8:
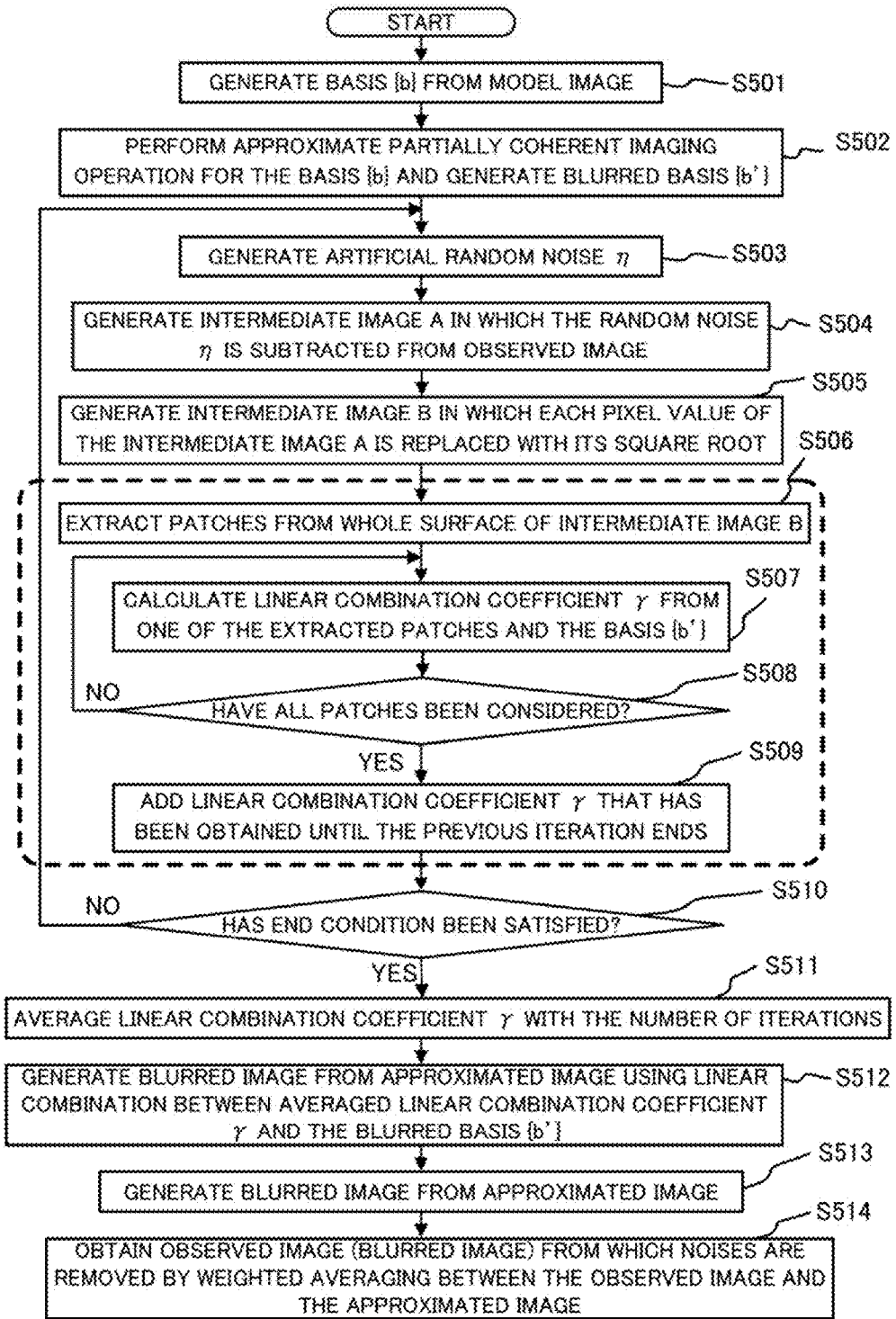
FIG. 8 is a flowchart for explaining an image processing method configured to generate a blurred image in which a noise caused by an image sensor is removed from an observed image according to the second embodiment.

FIG. 8 is a flowchart for explaining a method for generating a blurred image 105*g* by removing a noise caused by the image sensor from the observed image 105*f*.

Initially, the controller 103 refers to the storage unit 105, generates the basis {b} from the model image 105*d* similar to the processing of S202 (S501), and stores it in the storage unit 105. Each element of the basis {b} is normalized through a division using its L2 norm.

Next, the controller 103 generates the basis {b'} from the basis {b} similar to the processing of S402 (S502), and stores it in the storage unit 105.

Next, the controller 103 stores the pixel value generated for each pixel as the artificial random noise n in the random noise 105*m* of the storage unit 105 (S503). For example, the following normal random number may be used for random noise:

$$\eta = N(\mu, \rho)$$  Expression 11

Herein, $N(\mu, \rho)$ denotes the normal random number having an average value μ and a standard deviation ρ.

Next, the controller 103 refers to the storage unit 105, generates an intermediate image A by subtracting the random noise η from the observed image 105*f* for each pixel (S504), and stores the intermediate image A in the storage unit 105.

Next, the controller 103 refers to the storage unit 105, generates an intermediate image B that is made by replacing each pixel value of the intermediate image A with its square root (S505), and stores the intermediate image B in the storage unit 105.

Next, the controller 103 refers to the storage unit 105, and extracts the patches 105*i* from the entire intermediate image B similar to the processing of S204 (S506), and stores it in the storage unit 105.

Next, the controller 103 refers to the storage unit 105, calculates a linear combination coefficient γ using one of the patches 105*i* extracted from the whole intermediate image B and the basis {b'} similar to the processing of S205 (S507), and stores it in the storage unit.

Next, the storage unit 103 executes S507 for all patches 105*i* (S508).

Next, the controller 103 refers to the storage unit 105, adds the linear combination coefficient γ obtained by the previous iteration to the linear combination coefficient γ obtained by this iteration for each patch 105*i* (S509), and stores it in the storage unit 105.

Next, the controller 103 ends the iteration when the end condition designated by the user is satisfied, and the flow returns to S503 when the end condition is not satisfied (S510). The end condition designated by the user may be an upper limit of the number of iterations, for example. In other words, this embodiment generates a plurality of types of artificial random noises in the step of generating the random noises (S503).

Next, the controller 103 refers to the storage unit 105, averages the linear combination coefficients γ summed up for each iteration by the number of iterations for each patch 105*i* (S511), and stores the result in the storage unit 105. In other words, this embodiment averages the plurality of linear combination coefficients obtained corresponding to the plurality of types of random noises.

Next, the controller 103 refers to the storage unit 105, calculates the patch denoised with the linear combination coefficient γ and the basis {b'}, and reconstructs the approximated image by returning the patch to the extracted original location similar to the processing of S206 (S512), and stores it in the storage unit 105.

Next, the controller 103 performs S512 to all patches 105*i*, and generates the blurred image (S513), and stores it in the storage unit 105.

Next, the controller 103 refers to the storage unit 105, generates the finally blurred image 105*g* by weighted averaging between the observed image and the approximated image (S514), and stores the pixel value of the blurred image 105*g* in the storage unit 105.

The processing can be expedited when the processing of S507 is distributed among a plurality of operating units. The method of generating the blurred image 105*g* by removing the noise caused by the image sensor from the observed image 105*f* has been thus described.

Figure 9:
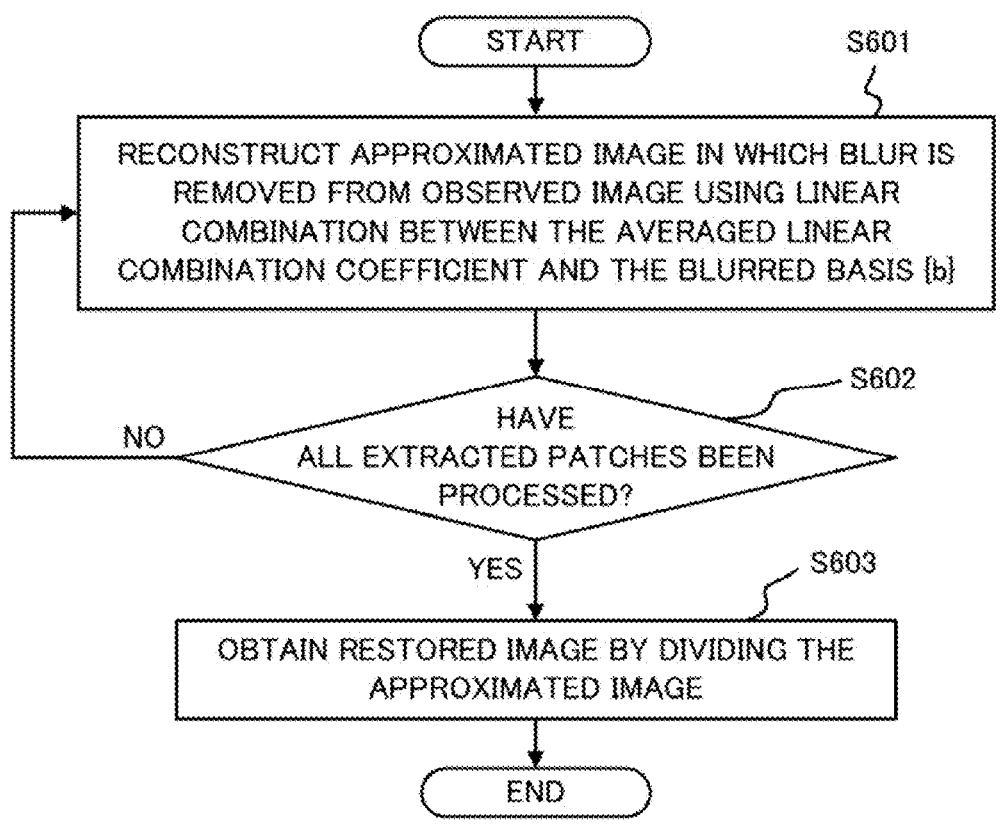
FIG. 9 is a flowchart for explaining processing of removing blurs from a blurred image according to the second embodiment.

FIG. 9 is a flowchart for explaining a method for generating a restored image 105*l* by removing the blur caused by the partially coherent imaging optical system from the blurred image 105*g* obtained in S514.

The controller 103 refers to the storage unit 105, calculates the patches 105*i* deblurred with the linear combination of elements of the basis {b} and the averaged linear combination coefficient, and reconstructs the approximated image 105k that has been deblurred by returning the patches 105i to the original locations (S601).

This embodiment also replaces the basis {b'} (which is a set of elements b'$_1$, b'$_2$, ..., b'$_n$) with the basis {b} (which is a set of elements b$_1$, b$_2$, ..., b$_n$). In other words, when the linear combination coefficient is expressed by a$_1$, a$_2$, ..., a$_n$, the patches are expressed as a$_1$·b'$_1$+a$_2$·b'$_2$+..., a$_n$·b'$_n$ in S512 and as a$_1$·b$_1$+a$_2$·b$_2$+..., a$_n$·b$_n$ in S601. The controller stores the approximated image 105k in the storage unit 105.

Next, the controller 103 performs S604 for all patches 105i, generates the finally approximated image (S602), and stores it in the storage unit 105.

Next, the controller 103 refers to the storage unit 105, and generates the pixel values of the finally restored image by dividing the pixel values at the overlapping locations of the patches 105i by the number of patches 105i (S603). The controller 103 displays the generated restored image 105l on the display unit 104 or stores it in the storage unit 105.

The method of generating the restored image 105l by removing the blur caused by the partially coherent imaging optical system from the blurred image 105g has been thus described.

FIGS. 10A-10E are views for explaining the effect of the image restoration method according to the second embodiment. These figures illustrate the result when the blurred image 105g is generated by removing the noise from the observed image 105f by a partially coherent imaging simulator, and then the restored image 105l is generated by removing the blur from the blurred image 105g. In addition, in order to compare this embodiment with the prior art, the result of generating the restored image 105l that is made by denoising and deblurring the observed image by the method disclosed in the literature 1 is also illustrated. The simulation condition is the same as that of the first embodiment. In the linear combination coefficient γ, there are about 10 to 15 non-zero elements.

Figure 10A:
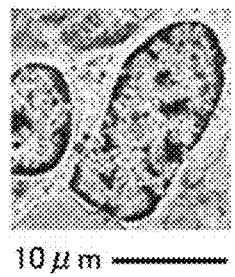
FIGS. 10A-10E are views for explaining effects of the image processing method according to the second embodiment.

FIG. 10A illustrates an original image corresponding to an object, similar to the original image of the first embodiment.

Figure 10B:
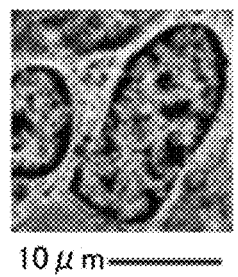

FIG. 10B illustrates a virtual object image, similar to the observed image of the first embodiment. In other words, a deterioration corresponding to a blur caused by the partially coherent imaging optical system is added to the original image by the partially coherent imaging simulator, and a white Gaussian noise of a standard deviation of 5% corresponding to the noise caused by the image sensor is further added.

Figure 10C:
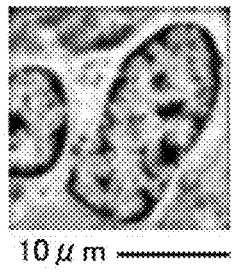

FIG. 10C illustrates a blurred image that is made by denoising the observed image in accordance with the flow of FIG. 8.

Figure 10D:
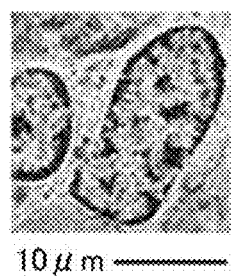

FIG. 10D illustrates a restored image that is made by deblurring the blurred image in accordance with the flow of FIG. 9.

Figure 10E:
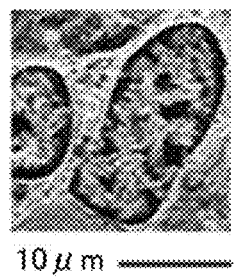

FIG. 10E illustrates a restored image that is made by denoising and deblurring the observed image by the method disclosed in the literature 1, similar to the restored image of the first embodiment.

Table 2 summarizes a quantitative evaluation result of the image quality. In order to compare the second embodiment with the prior art, the image restoration result made by the method disclosed in the literature 1 is included. The evaluation index uses the PSNR, similar to the first embodiment.

TABLE 2

| | Observed Image | Denoised image (blurred image) | Restored image | Restored image made by the method of literature 1 |
|---|---|---|---|---|
| PSNR [dB] | 12.17 | 16.62 | 19.87 | 13.71 |

It is understood from FIG. 10 and Table 2 that this embodiment can generate a higher-quality restored image.

The present invention is applicable to an application of restoring an image obtained by a digital microscope, suitable, for example, for an image obtained by a virtual slide.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-185318, filed Aug. 24, 2012, which is hereby incorporated by reference herein in its entirety.

What is claimed is:

1. An image restoration method configured to restore an original image from an observed image obtained through a photoelectric conversion of an optical image formed by partially coherent imaging, the image restoration method comprising the steps of:

performing an approximate partially coherent imaging operation for elements of a first basis generated from a model image that is assumed to have no noise and no blur, and generating based upon the first basis a second basis that is blurred, the approximate partially coherent imaging operation being expressed by a convolution integral on an eigenfunction corresponding to a maximum eigenvalue of a Kernel matrix and each element of the first basis;

generating an intermediate image in which each pixel value of the observed image that has been denoised is replaced with its square root; and obtaining a restored image by approximating each of a plurality of patches that are set to entirely cover the intermediate image, using a linear combination of elements of the first basis and linear combination coefficients obtained when each patch is approximated by a linear combination of the second basis.

2. The image restoration method according to claim 1, further comprising the steps of:

performing a partially coherent imaging operation for the model image and generating a blurred model image;

generating a third basis from the blurred model image; and generating the observed image denoised through weighted averaging between the observed image and an approximated image obtained by approximating each of the plurality of patches set to entirely cover the observed image using a linear combination of elements of the third basis.

3. The image restoration method according to claim 1, further comprising the steps of:

generating a plurality of artificial random noises; and generating the observed image that has been denoised by subtracting the random noises from the observed image, wherein the linear combination coefficient is an average of a plurality of types of linear combination coefficients corresponding to a plurality of types of random noises.

4. The image restoration method according to claim 3, wherein a normal random number is used for the artificial random noises.

5. An image restoration apparatus configured to restore an original image from an observed image obtained through a photoelectric conversion of an optical image formed by partially coherent imaging, the image restoration method comprising the steps of:
- a unit configured to perform an approximate partially coherent imaging operation for elements of a first basis generated from a model image that is assumed to have no noise and no blur, and to generate based upon the first basis a second basis that is blurred, the approximate partially coherent imaging operation being expressed by a convolution integral on an eigenfunction corresponding to a maximum eigenvalue of a Kernel matrix and each element of the first basis;
- a unit configured to generate an intermediate image in which each pixel value of the observed image that has been denoised is replaced with its square root; and
- a unit configured to obtain a restored image by approximating each of a plurality of patches that are set to entirely cover the intermediate image, using a linear combination of elements of the first basis and linear combination coefficients obtained when each patch is approximated by a linear combination of the second basis.

6. A non-transitory tangible medium storing a program that enables a computer to execute an image restoration method configured to restore an original image from an observed image obtained through a photoelectric conversion of an optical image formed by partially coherent imaging, the image restoration method comprising the steps of:
- performing an approximate partially coherent imaging operation for elements of a first basis generated from a model image that is assumed to have no noise and no blur, and generating based upon the first basis a second basis that is blurred, the approximate partially coherent imaging operation being expressed by a convolution integral on an eigenfunction corresponding to a maximum eigenvalue of a Kernel matrix and each element of the first basis;
- generating an intermediate image in which each pixel value of the observed image that has been denoised is replaced with its square root; and
- obtaining a restored image by approximating each of a plurality of patches that are set to entirely cover the intermediate image, using a linear combination of elements of the first basis and linear combination coefficients obtained when each patch is approximated by a linear combination of the second basis.

7. An image-pickup apparatus comprising:
- an imaging optical system configured to form an optical image of an object by partially coherent imaging;
- an image sensor configured to photoelectrically convert the optical image formed by the imaging optical system; and
- a computer configured to restore an original image as the object from an observed image obtained from the image sensor, wherein the computer
- performs an approximate partially coherent imaging operation for elements of a first basis generated from a model image that is assumed to have no noise and no blur, and generates based upon the first basis a second basis that is blurred, the approximate partially coherent imaging operation being expressed by a convolution integral on an eigenfunction corresponding to a maximum eigenvalue of a Kernel matrix and each element of the first basis;
- generates an intermediate image in which each pixel value of the observed image that has been denoised is replaced with its square root; and
- obtains a restored image by approximating each of a plurality of patches that are set to entirely cover the intermediate image, using a linear combination of elements of the first basis and linear combination coefficients obtained when each patch is approximated by a linear combination of the second basis.

* * * * *